3,574,709
CARBAMYL THIOETHERS
Alfred Froehlich, Marly-le-Grand, Switzerland, assignor to Ciba Limited, Basel, Switzerland
No Drawing. Filed Oct. 18, 1967, Ser. No. 676,031
Claims priority, application Switzerland, Oct. 27, 1966, 15,582/66
Int. Cl. C07c 127/22, 149/20
U.S. Cl. 260—481      7 Claims

ABSTRACT OF THE DISCLOSURE

The present invention provides new thioethers which are suitable for sensitizing photographic material containing a silver halide.

---

The present invention provides new thioethers of the formula (1)

$$HO-CH_2CH_2-S-(CH_2)_m-\underset{\underset{O}{\|}}{C}-NH-\underset{\underset{O}{\|}}{C}-\left(X-Y-X-\underset{\underset{O}{\|}}{C}\right)_{n-1}-NH-\underset{\underset{O}{\|}}{C}-(CH_2)_m-S-CH_2CH_2-OH$$

wherein X denotes an oxygen or sulphur atom, or a group —NH—, —NH—CO— or —NH—NH—CO—, in which the groups containing —NH—CO— are bound to Y by the carbon atoms; Y denotes a group —$(CH_2—)_p$, wherein $p=1$ to 10, a group —$(CH_2—)_r$—[O—$(CH_2—)_r$]$_q$— wherein $q=1$ to 4 and $r=1$ or 2 or a group

—$(CH_2—)_r$—S—$(CH_2—)_r$— wherein $r=1$ or 2; when X=—NH—, Y may also denote —$SO_2$ and when X=—NH—, —NH—CO— or —NH—NH—CO—, Y may also be a phenylene group or a heterocyclic ring; and $m$ and $n$ each=1 or 2. The scheme of formulae appended hereto gives a survey of the various combinations of the bridge members X and Y.

Amongst these thioethers, compounds of formula (2)

$$HO-CH_2CH_2-S-(CH_2)_m-\underset{\underset{O}{\|}}{C}-NH-\underset{\underset{O}{\|}}{C}-\left(X_1-Y_1-X_1-\underset{\underset{O}{\|}}{C}\right)_{n-1}-(CH_2-)_m-S-CH_2CH_2-OH$$

wherein $X_1$ denotes an oxygen atom, a group —NH— or —NH—CO—, in which the —NH—CO— group is bound to $Y_1$ by the carbon atom, $Y_1$ denotes a group —$(CH_2)—_{p_1}$ wherein $p_1=2$ to 10, a group —$CH_2CH_2—(O—CH_2CH_2)_q$— wherein $q=1$ to 4, or a group

—$CH_2CH_2—S—CH_2CH_2$— and $m$ and $n$ each=1 or 2, are preferred.

Amongst these, thioethers of formula (3)

$$HO-CH_2CH_2-S-(CH_2)_m-\underset{\underset{O}{\|}}{C}-NH-\underset{\underset{O}{\|}}{C}-\left(X_2-Y_2-X_2-\underset{\underset{O}{\|}}{C}\right)_{n-1}-NH-\underset{\underset{O}{\|}}{C}-(CH_2)_m-S-CH_2CH_2-OH$$

wherein $X_2$ denotes an oxygen atom, $Y_2$ denotes a group —$CH_2CH_2—(O—CH_2CH_2—)_q$, wherein $q=1$ to 4, or a group —$CH_2CH_2—S—CH_2CH_2$—, and $m$ and $n$ each=1 or 2, are of particular interest. When $n=1$, the compounds are urea derivatives which, when $m=2$, correspond to the formula (4)

$$HO-CH_2CH_2-S-CH_2CH_2-\underset{\underset{O}{\|}}{C}-NH-\underset{\underset{O}{\|}}{C}-NH-CO-CH_2CH_2-SCH_2CH_2OH$$

when $n=2$, the compounds are thioethers of formulae (5)

$$HO-CH_2CH_2-S-CH_2CH_2-\underset{\underset{O}{\|}}{C}-NH-\underset{\underset{O}{\|}}{C}-CH_2CH_2-S-CH_2CH_2-O-\underset{\underset{O}{\|}}{C}-NH-\underset{\underset{O}{\|}}{C}-CH_2CH_2-S-\underset{\underset{OH}{|}}{\overset{CH_2}{\underset{|}{CH_2}}}$$

(6)

$$HO-CH_2CH_2-S-(CH_2)_m-\underset{\underset{O}{\|}}{C}-NH-\underset{\underset{O}{\|}}{C}-O-CH_2CH_2-(O-CH_2CH_2)_q-O-\underset{\underset{O}{\|}}{C}-NH-\underset{\underset{O}{\|}}{C}-(CH_2)_m-\underset{\underset{OH}{|}}{\overset{S}{\underset{|}{\overset{CH_2}{\underset{|}{CH_2}}}}}$$

and (6a)

$$HO-CH_2CH_2-S-CH_2CH_2-\underset{\underset{O}{\|}}{C}-NH-\underset{\underset{O}{\|}}{C}-O-(CH_2)_{p_1}-O-\underset{\underset{O}{\|}}{C}-NH-\underset{\underset{O}{\|}}{C}-CH_2CH_2-S-CH_2CH_2-OH$$

which are particularly preferred.

The thioethers of Formulae (1) to (6a) may be manufactured by reacting a compound of formula (7)

$$R-\underset{\underset{O}{\|}}{C}-NH-\underset{\underset{O}{\|}}{C}-\left(X-Y-X-\underset{\underset{O}{\|}}{C}\right)_{n-1}-NH-\underset{\underset{O}{\|}}{C}-R$$

wherein R denotes a $CH_2=CH$— group or a group Hal—$(CH_2)_m$—, in which Hal represents a halogen atom, preferably chlorine or bromine, and X, Y, m and n have the significance indicated, with 1,2-mercaptoethanol, optionally in the form of its alkali metal salt of formula HO—CH₂CH₂—S—alkali metal, preferably the sodium salt, or with 1,2-mercaptoethanol in the presence of tertiary amines, preferably triethylamine. Thus, on the one hand, dihalogen compounds which are derived from Formula (7) may be condensed with 1,2-mercaptoethanol, or with its alkali metal salts or with 1,2-mercaptoethanol in the presence of a tertiary amine, e.g., trimethylamine, triethylamine or pyridine or, on the other hand, 1,2-mercaptoethanol may be added to the olefinic double bond of a divinyl compound which is derived from Formula (7). It is however also possible to start from the compound of Formula (7) in which R represents the group HS—(CH₂)ₘ—. This compound may be reacted with ethylene oxide or with a 2-halogen-ethanol, preferably with 2-chloroethanol or 2-bromoethanol, in the presence of tertiary bases or in the form of the alkali metal salt.

The ester-like or amide-like bonds between the left-hand and right-hand molecular halves in the compound of Formula (7) may be for example obtained by reacting the corresponding acylisocyanates with a difunctional alcohol, thioalcohol, amine, amide or hydrazide, for example

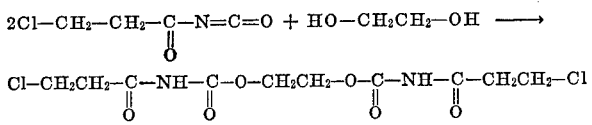

Suitable dihydric alcohols or thioalcohols are for example: ethylene glycol, diethylene glycol, triethylene glycol, tetraethylene glycol, pentaethylene glycol, 1,6-hexanediol, 1,10-decanediol, thioethylene glycol or dithioethylene glycol. As the diamines the following may be for example used: ethylene diamine, 1,6-diaminohexane, m-phenylenediamine or a m-phenylenediaminocarboxylic acid. Suitable diamides are for example oxalic acid diamide, malonic acid diamide, succinic acid diamide, glutaric acid diamide, adipic acid diamide, sebacic acid diamide, terephthalic acid diamide or thiophenedicarboxylic acid diamide. The dihydrazides may be derived from the same dicarboxylic acids as the diamides, for example malonic acid dihydrazide.

Another way of producing the ester-like or amide-like bonds in the compound of Formula (7) consists of reacting diisocyanates or dicyanic acid esters with the appropriate acid amides, for example

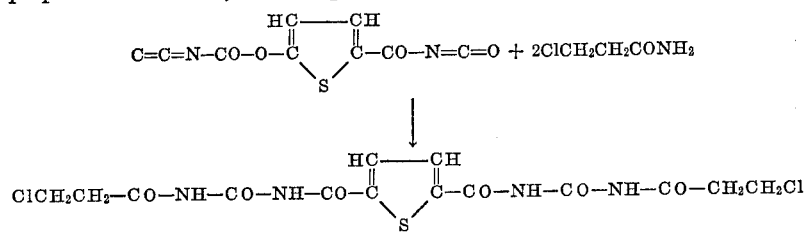

or

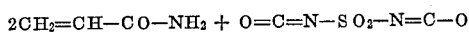

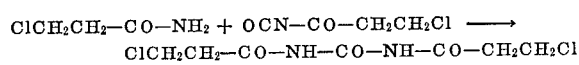

or by reacting acylisocyanates with acylamides, for example

ClCH₂CH₂—CO—NH₂ + OCN—CO—CH₂CH₂Cl ⟶
ClCH₂CH₂—CO—NH—CO—NH—CO—CH₂CH₂Cl

The thioethers of Formula (1) of the invention are advantageously used as sensitisers in photographic material cotaining silver halide, since their presence during the development process is able to increase the sensitivity of photographic silver halide layers.

It is known that the sensitivity of photographic emulsions may be increased by optical or chemical sensitisation. In the first case the sensitivity in a certain spectral region is caused or increased by adding certain dyestuffs; in the latter case the general sensitivity is increased by adding chemical sensitisers. Such chemical sensitisers are for example sulphur compounds which, like thioureas, are capable of reacting with the silver salts of the emulsion. They increase the general sensitivity of the emulsion, depending on the amount added, up to a certain degree which for practical purposes is reached when a further addition of sensitiser causes a silver haze. It is also known that the sensitivity may be increased by adding noble metal compounds, preferably gold compounds.

This invention is based on the observation that the thioethers of Formula (1) increase the sensitivity of the emulsion quite generally and beyond the degree attainable by optical or chemical sensitisation, when these new compounds are brought into play at any stage of the manufacturing process and/or processing of the silver halide emulsion, before or during the silver development.

For example, the water-soluble thioether of Formula (4) has considerable advantages over the known thioether which is only alcohol-soluble and which only differs from the thioether of Formula (4) in that it has a —CH₂— group in the centre of the molecule in place of a —CO— group. Whilst the known thioether is only able to increase the sensitivity by 50%, the thioether of Formula (4), used in the same photographic material increases the sensitivity by 250%. In other words, the sensitivity increase is 5 times greater. At the same time the haze is the same in both cases. Additionally, the thioether of Formula (4) also increases the maximum optical density by about 9% relative to a photographic material whose sensitivity has been increased by the known thioether.

Accordingly the present invention also provides a process for increasing the sensitivity of photographic material containing a silver halide wherein thioethers of one of Formulae (1) to (6a) are applied to the light-sensitive photographic layers before or during the silver development. The thioethers may for example be added to the emulsions during manufacture, optionally before ripening, before chemical and/or optical sensitisation or before casting. They may however also be contained in a separate layer which is free from silver halide, and this layer may at the same time also fulfil a special function as a separating layer, protective layer or filter layer, or alternatively the new compounds may be applied to the exposed photographic material during processing in the treatment baths, for example in a silver development bath or a separate bath. It may however also be advantageous to add the thioethers both to the emulsions during their manufacture or before casting and also to the treatment baths. The increase in sensitivity may also be exploited by adding the new thioethers to the photographic layers or to the development baths to shorten the development time; the thioethers thus act as development accelerators.

The sensitisers of the invention are soluble in water or alcohol and may be added to the photographic emulsions during the manufacturing process or before casting, in amounts of 0.0005 to 00.05 mol per mol of silver halide. The emulsions may optionally be mixed with optical or chemical sensitisers and the usual casting additives for example stabilisers, hardeners and flow agents, or with dyestuffs or dyestuff formers when they are to be used for colour photography purposes. The optimum quantity is somewhat different for each type of emulsion. In general the addition of 0.001 to 0.006 mol has proved successful. The sensitisers of the invention however also exert their effect when they are able to act on the layers either through a separate bath prior to development, or as a developer additive.

When the sensitisers of the invention are applied to the photographic material in a treatment bath during processing, concentrations of 0.0001 to 0.02 mol, preferably 0.00025 to 0.005 mol, per litre of bath liquid are used.

Thus the invention also provides both photographic materials and photographic treatment baths, preferably silver development baths, which contain the thiothers according to one of Formulae (1) to (6a).

In the examples which follow, the percentages denote percentages by weight.

EXAMPLE 1

Ethylene glycol-bis-(2-hydroxyethyl-β-thiopropionyl-carbamic-acid ester (8)
HO—$CH_2CH_2$—S—$CH_2CH_2$—CO—
 NH—COO—$CH_2CH_2$—OOC—NH—
  CO—$CH_2CH_2$—S—$CH_2CH_2$—OH 26.8 g. of β-chloropropionylisocyanate, dissolved in 100 ml. of absolute ether are added dropwise at 0 to 5° C. to a solution of 6.2 g. of ethylene glycol in 200 ml. of absolute ether. When all the material has been added the mixture is stirred for a further 12 hours at room temperature. A white powder precipitates, which is filtered and washed with ether. Yield: 32 g. of colourless crystals. Melting point: 174° C. The substance is dissolved in 40 ml. of dimethylformamide at 40° C., and is then mixed with 40 ml. of methanol and cooled. The precipitated crystals are washed with ether. Melting point: 182° C.

Analysis.—$C_{10}H_{14}O_6N_2Cl_2$: Calculated: C, 36.49; H, 4.29; N, 8.51; Cl, 21.54. Found: C, 36.2; H, 4.5; N, 8.6; Cl, 21.7.

6 g. of ethylene glycol-bis-(β-chloropropionylcarbamic acid ester) are dissolved in 100 ml. of dimethylformamide and added to a solution of 1.2 g. of sodium in 40 ml. of 1,2-mercaptoethanol. The solution becomes warm and turns cloudy, and a solid compound separates. After 4 hours this is filtered, and washed with water, methanol and ether. The material is dissolved in a little dimethylformamide at 70° C. and the solution mixed with twice its volume of methanol. The solution is cooled, filtered, and the material washed with methanol and ether. Yield: 4.8 g. of colourless crystals. Melting point: 165° C.

Analysis.—$C_{14}H_{24}O_8N_2S_2$: Calculated: C, 47.78; H, 5.88; N, 6.79; S, 15.66. Found: C, 40.52; H, 5.61; N, 6.70; S, 15.46.

EXAMPLE 2

1,6-hexanediol-bis-(2-hydroxyethyl-β-thiopropionyl-carbamic acid ester (9) HO—$CH_2CH_2$—S—$CH_2CH_2$—
 CO—NH—COO—$(CH_2)_6$—OOC—NH—CO—
  $CH_2CH_2$—S—$CH_2CH_2$—OH 5.9 g. of 1,6-hexanediol are dissolved in 100 ml. of acetonitrile. 13.4 g. of β-chloropropionylisocyanate dissolved in 50 ml. of absolute ether are added dropwise whilst cooling in ice. When all the material has been added the mixture is stirred for a further 12 hours at room temperature, the product filtered and washed with ether. Yield: 19.1 g. of colourless crystals. A sample recrystallised from ethanol melts at 143° C.

Analysis.—$C_{14}H_{22}O_6N_2Cl_2$: Calculated: C, 43.65; H, 5.76; N, 7.27; Cl, 18.41. Found: C, 43.5; H, 5.7; N, 7.3; Cl, 18.4.

3.85 g. of 1,6-hexanediol-bis-(β-chloropropionylcarbamic acid ester) are introduced at room temperature into a solution of 0.6 g. of sodium in 20 ml. of 1,2-mercaptoethanol. The mixture is stirred for 4 hours at room temperature, the product filtered and washed with water, methanol and ether. After recrystallisation from ethanol 3.1 g. of colourless crystals of melting point 151° C. are obtained.

Analysis.—$C_{18}H_{32}O_8N_2S_2$: Calculated: C, 46.14; H, 6.88; N, 5.98; S, 13.69. Found: C, 46.0; H, 7.0; N, 5.7; S, 13.6.

EXAMPLE 3

1,10-decanediol-bis-(2-hydroxyethyl-β-thiopropionyl-carbamic acid ester

(10) HO—$CH_2CH_2$—S—$CH_2CH_2$—
 CO—NH—COO—$(CH_2)_{10}$—OOC—NH—CO—
  $CH_2CH_2$—S—$CH_2CH_2$—OH 8.7 g. of 1,10-decanediol are dissolved in 175 ml. of acetonitrile and 13.4 g. of 2-chloropropionylisocyanate dissolved in 75 ml. of absolute ether are added dropwise thereto at 35–40° C. The mixture is stirred for a further 4 hours at room temperature, the product filtered, washed with ether and crystallised from a mixture of 1 part of dimethylformamide and 3 parts of ethanol. Yield: 19.5 g. of colourless crystals of melting point 138° C.

Analysis.—$C_{18}H_{30}O_6N_2Cl_2$: Calculated: C, 48.99; H, 6.85; N, 6.35; Cl, 16.07. Found: C, 49.3; H, 7.1; N, 6.3; Cl, 16.0.

8.8 g. of 1,10-decanediol-bis-(β-chloropropionylcarbamic acid ester) dissolved in 100 ml. of dimethylformamide are added to a solution of 1.2 g. of sodium in 40 ml. of 1,2-mercaptoethanol at room temperature. The mixture is stirred for a further 4 hours at room temperature, the product filtered and washed with water, methanol and ether and crystallised from ethanol. Yield: 7.8 g. of colourless crystals of melting point 145° C.

Analysis.—$C_{22}H_{40}O_8N_2S_2$: Calculated: C, 50.36; H, 7.68; N, 5.34; S, 12.22. Found: C, 50.06; H, 7.80; N, 5.30; S, 12.40.

EXAMPLE 4

Diethylene glycol-bis-(2-hydroxyethyl-2-thiopropionylcarbamic acid ester

(11) $HOCH_2CH_2$—S—$CH_2CH_2$—CO—
 NH—COO—($CH_2CH_2$—O—$CH_2CH_2$)OOC—
  NH—CO—$CH_2CH_2$—HO—$CH_2CH_2$—S 10.6 g. of diethylene glycol are mixed with 150 ml. of absolute ether and 27 g. of β-chloropropionylisocyanate dissolved in 100 ml. of ether are added dropwise whilst cooling in ice and stirring. The mixture is stirred for a further 4 hours at room temperature, the product filtered and washed with 50 ml. of methanol and with ether. The product is dissolved in 150 ml. of dimethylformamide at 45° C., and the filtered solution is mixed with 150 ml. of methanol. The mixture is cooled to 0° C., the product filtered and washed with ether. Yield: 32 g. of colourless crystals of melting point 143° C.

Analysis.—$C_{12}H_{18}O_7N_2Cl_2$: Calculated: C, 38.62; H, 4.86; N, 7.51; Cl, 19.00. Found: C, 38.9; H, 5.0; N, 7.1; Cl, 19.2.

7.4 g. of diethylene glycol-bis-(β-chloropropionylcarbamic acid ester) dissolved in 100 mg. of dimethylformamide are added to a solution of 1.2 g. of sodium in 40 ml.

of 1,2-mercaptoethanol at room temperature and the mixture is stirred for a further 12 hours at room temperature. The product is then filtered, washed with methanol, water and again with methanol. After recrystallisation from alcohol 7.2 g. of colourless crystal of melting point 182° C. are obtained.

*Analysis.*—$C_{16}H_{28}O_9N_2S_2$: Calculated: C, 42.09; H, 6.18; N, 6.14; S, 14.05. Found: C, 42.2; H, 6.2; N, 6.1; S, 14.2.

EXAMPLE 5

Triethylene glycol-bis-(2-hydroxyethyl-β-thiopropionylcarbamic acid ester)

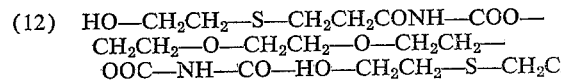

15 g. of triethylene glycol are mixed with 100 ml. of absolute ether and 27 g. of β-chloropropionylisocyanate dissolved in 100 ml. of absolute ether are added dropwise whilst cooling in ice. The mixture is stirred for a further 4 hours at room temperature, the product filtered, washed with ether and recrystallised from 150 ml. of methanol. Yield: 36 g. of colourless crystals of melting point 110° C.

*Analysis.*—$C_{14}H_{22}O_8N_2Cl_2$: Calculated: C, 40.40; H, 5.31; N, 6.71; Cl, 17.0. Found: C, 39.80; H, 5.36; N, 6.80; Cl, 17.60.

A solution of 8.3 g. of triethylene glycol-bis-(β-chloropropionylcarbamic acid ester) dissolved in 50 ml. of dimethylformamide is introduced into a solution of 1.2 g. of sodium in 30 ml. of 1,2-mercaptoethanol at a temperature of 5 to 10° C. The mixture is stirred for a further 4 hours at room temperature, the product filtered and washed with methanol and water. Recrystallisation from 90% alcohol yields 6.8 g. of colourless crystals of melting point 121° C.

*Analysis.*—$C_{18}H_{32}O_{10}N_2S_2$: Calculated: C, 43.19; H, 6.44; N, 5.60; S. 12.81. Found: C, 43.13; H, 6.60; N, 5.75; S, 12.90.

EXAMPLE 6

Tetraethylene glycol-bis-(2-hydroxyethyl-β-thiopropionyl- carbamic acid ester)

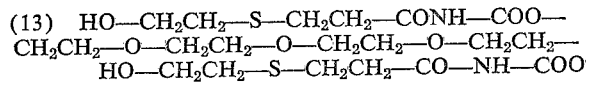

19.4 g. of tetraethylene glycol are dissolved in 100 ml. of absolute acetonitrile and 27 g. of β-chloropropionylisocyanate dissolved in 100 ml. of ether are added dropwise at 0 to 5° C. The mixture is stirred for a further 4 hours at room temperature, the product filtered, washed with ether and recrystallized from 150 ml. of methanol. Yield: 37.8 g. of colourless crystals. Melting point: 189° C.

*Analysis.*—$C_{16}H_{26}O_9N_2Cl_2$: Calculated: C, 41.66; H, 5.68; N, 6.07; Cl, 15.37. Found: C, 41.3; H, 5.7; N, 6.1; Cl, 15.5.

4.61 g. of tetraethylene glycol-bis-(β-chloropropionyl- carbamic acid ester) are introduced into a solution of 0.46 g. of sodium in 15 ml. of 1,2-mercaptoethanol at 5° C. The mixture is stirred for a further 12 hours at room temperature, mixed with 50 ml. of absolute ether, the product filtered and washed with ether. The residue is triturated with 15 ml. of ice water, filtered, and washed three times with 15 ml. of ice water each time. It is recrystallised from 30 ml. of water and 4.2 g. of colourless crystals of melting point 109° C. are obtained.

*Analysis.*—$C_{20}H_{36}O_{11}N_2S_2$: Calculated: C, 44.1; H, 6.66; N, 5.14; S, 11.77. Found: C, 44.5; H, 6.7; N, 5.2; S, 11.9.

EXAMPLE 7

N,N′-sulphonyl-bis-(2-hydroxyethyl-β-thiopropionylurea)

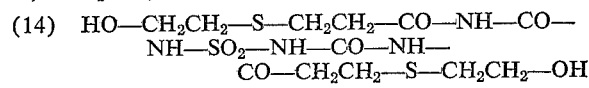

Method A.—7.2 g. of β-chloropropionic acid amide are suspended in 100 ml. of absolute ether and a solution of 4.9 g. of sulphonyldiisocyanate dissolved in 500 ml. of absolute ether is added dropwise at 0 to 5° C. The mixture is stirred for a further 24 hours at room temperature, the product filtered and washed with ether. Yield: 12 g. of colourless crystals. Melting point: 177° C. with decomposition.

*Analysis.*—$C_8H_{12}O_6Cl_2S$: Calculated: C, 26.46; H, 3.33; N, 15.43; S, 8.89; Cl, 19.52. Found: C, 26.8; H, 3.2; N, 15.0; S, 8.5; Cl, 19.1.

2. g. of sodium are dissolved in 40 ml. 1,2-mercapto- ethanol and 4 g. of N,N′-sulphonyl-bis-(2-chloropropion- ylurea) are added at 20° C. The mixture is stirred for a further 24 hours at room temperature, then mixed with 100 ml. of ethanol, filtered, the residue dissolved in 100 ml. of water and the solution filtered, the mother liquor adjusted to a pH-value of 3, the product filtered, washed with water and dried in vacuo at 30° C. Yield: 3.7 g. of colourless crystals. Melting point: 147° C., with decomposition.

*Analysis.*—$C_{12}H_{22}O_8N_4S_3$: Calculated: C, 32.28; H, 4.97; N, 12.55; S, 21.54. Found: C, 32.24; H, 5.05; N, 12.52; S, 21.72.

Method B.—71 g. of acrylamide are suspended in 2000 ml. of absolute ether and a solution of 74 g. of sulphonyl- diisocyanate dissolved in 500 ml. of absolute ether is added dropwise at −5° C. The mixture is stirred for a further 12 hours at room temperature, the product filtered, washed with ether and dried in vacuo at 30 to 40° C. Yield: 140 g. Melting point: 186° C., with decomposition.

*Analysis.*—$C_8H_{10}N_4O_6S$: Calculated: C, 33.10; H, 3.47; N, 19.30; S, 11.05. Found: C, 33.3; H, 3.6; N, 19.4; S, 11.1.

5.8 g. of N,N′-sulphonyl-bis-acryloylurea and 0.2 g. of hydroquinone are dissolved in 10 ml. of dimethylformamide at 30° C. and mixed at room temperature with 1 ml. of benzyl trimethyl ammonium hydroxide in the form of a 40% methanolic solution together with 4 g. of 1,2-mercaptoethanol and stirred, whereupon the temperature of the mixture rises to 30–35° C. After a further 2 hours stirring at room temperature the mixture is introduced into 100 ml. of water, the product filtered and washed with water. The residue is recrystallised from 150 ml. of ethanol. Yield: 3.2 g. of colourless crystals which correspond to the product of Method A. Melting point: 147° C.

*Analysis.*—$C_{12}H_{22}O_8N_4S_3$: Calculated: C, 32.28; H, 4.97; N, 12.55; S, 21.54. Found: C, 32.24; H, 5.10; N, 12.30; S, 21.40.

EXAMPLE 8

N,N′-bis(2-hydroxyethyl-β-thiopropionyl)-urea

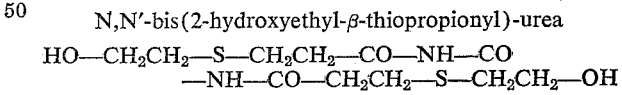

30 g. of β-chloropropionylisocyanate and 21 g. of β-chloropropionic acid amide are mixed and slowly heated to 120° C. When the reaction starts, which is at about 100° C., external cooling is provided to ensure that the temperature does not exceed 120° C. The mixture is then diluted with ether, the product filtered and twice recrystalised from 50 ml. of methanol. 41 g. of colourless crystals of melting point 119° C. are obtained.

*Analysis.*—$C_7H_{10}N_2O_3Cl_2$: Calculated: C, 34.90; H, 4.18; N, 11.62; Cl, 29.50. Found: C, 35.2; H, 4.2; N, 11.6; Cl, 29.9.

The N,N′-bis-β-chloropropionylurea can also be obtained in good yield by heating β-chloropropionylisocyanate with organic acids for example propionic, oxalic, succinic or adipic acid, in a neutral solvent. For example a mixture of 14 g. of β-chloropropionylisocyanate, 50 ml. of chlorobenzene and 7.3 g. of adipic acid is heated with stirring on a boiling water bath for 15 minutes, the chlorobenzene is removed in vacuo, and the residue is crystallised from 250 ml. of water and charcoal. 10.8 g. of colourless crystals of melting point 119° C. are obtained.

*Analysis.*—$C_7H_{10}N_2O_3Cl_2$: Calculated: C, 34.90; H, 4.18; N, 11.62; Cl, 29.50. Found: C, 35.2; H, 4.6; N, 11.6; Cl, 29.2.

4.8 g. of N,N'-bis-β-chloropropionylurea are dissolved in 25 ml. of 1,2-mercaptoethanol and 4.1 g. of triethylamine are slowly added dropwise whilst cooling in ice. The mixture is stirred for a further 24 hours while the temperature is allowed to rise slowly to room temperature. The mixture is then diluted with 50 ml. of ether, the product filtered, washed with ether and recrystallised from 100 ml. of ethanol. Melting point: 123° C.

*Analysis.*—$C_{11}H_{20}N_2O_5S_2$: Calculated: C, 40.72; H, 6.21; N, 8.64; S, 19.75. Found: C, 40.72; H, 6.40; N, 8.60; S, 19.40.

EXAMPLE 9

Tetraethylene glycol - bis - (2-hydroxyethyl-thioacetylcarbamic acid ester)

(15)
HO—CH₂CH₂—S—CH₂—CO—NH—COO—
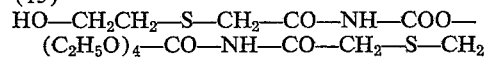
—CO—NH—CO—CH₂—S—CH₂CH₂—OH 9.7 g. of tetraethylene glycol are dissolved in 50 ml. of absolute acetonitrile and a solution of 12 g. of chloracetylisocyanate dissolved in 50 ml. of absolute ether is added dropwise thereto at 0° C. with stirring. The mixture is stirred for a further 4 hours at room temperature, the product filtered and washed with 100 ml. of ether. After recrystallisation from ethanol 18 g. of tetraethylene glycol-bis-(chloroacetylaminocarbamic acid ester) are obtained as a white powder of melting point 66° C. in a yield of 18 g.

*Analysis.*—$C_{14}H_{22}O_9N_2Cl_2$: Calculated: Cl, 16.39. Found: Cl, 16.00.

4.3 g. of this ester are added to a solution of 0.46 g. of sodium in 15 ml. of 1,2-mercaptoethanol and the mixture is stirred for 72 hours at room temperature. 100 ml. of ether are then added, the mixture stirred for a further 2 hours, the product filtered and washed with ether. The residue is triturated with 15 ml. of ice water, the product filtered, washed three times with 15 ml. of ice water each time and dried at 40° C. in vacuo. After recrystallisation from ethanol 2.6 g. of colourless crystals of melting point of 84° C. are obtained.

*Analysis.*—$C_{14}H_{32}O_{11}N_2S_2$: Calculated: C, 41.87; H, 6.21; N, 5.43; S, 12.41. Found: C, 41.9; H, 6.3; N, 5.6; S, 12.5.

EXAMPLE 10

N,N'-bis-(2-hydroxyethyl-β-thiopropionylaminocarboyl)-1,6-hexamethylenediamine

(16)
HO—CH₂CH₂—S—CH₂CH₂—CO—NH—CO—NH—
(CH₂)₆—NH—CO—NH—CO—CH₂CH₂—HO—
CH₂CH₂—S 4.5 g. of 1,6-diaminohexane are dissolved in 150 ml. of absolute ether and a solution of 9.1 g. of chloropropionylisocyanate dissolved in 25 ml. of absolute ether is added dropwise at 0° C. with stirirng. The mixture is stirred for a further 3 hours at room temperature, the product filtered, washed with ether, and the residue recrystallised from 225 ml. of 100% acetic acid. 11.9 g. of N,N'-bis-(β-chloropropionyl-aminocarboyl) - 1,6 - hexamethylenediamine are obtained as white crystals of melting point 197° C.

*Analysis.*—$C_{14}H_{24}O_4N_4Cl_2$: Calculated: Cl, 18.54. Found: Cl, 18.32.

8.66 g. of this product are introduced into a solution of 0.92 g. of sodium in 30 ml. of 1,2-mercaptoethanol and the mixture heated to 110° C. When this temperature has been reached the mixture is stirred for a further hour without heating. The reaction mixture is stirred into 150 ml. of water, filtered, and the residue washed with water until free from halogen. The product is recrystallised from a mixture of 250 ml. of ethanol and 200 ml. of water. Yield: 7.9 g. of colourless crystals of melting point 165° C.

*Analysis.*—$C_{18}H_{34}O_6N_4S_2$: Calculated: C, 46.33; H, 7.34; N, 12.01; S, 13.74. Found: C, 46.4; H, 7.5; N, 12.0; S, 13.8.

EXAMPLE 11

(17)
HO—CH₂CH₂—S—CH₂—CONH—COO—CH₂CH₂—
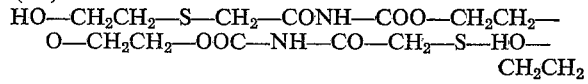
O—CH₂CH₂—OOC—NH—CO—CH₂—S—HO—
CH₂CH₂

1.76 g. of diethylene glycol are dissolved in 20 ml. of acetonitrile and a solution of 2 g. of chloracetylisocyanate dissolved in 20 ml. of absolute ether is added dropwise at —10° C. When it has all been added, a further 20 ml. of ether are added and the mixture stirred for a further 12 hours at room temperature. It is then filtered and the residue recrystallised from 150 ml. of methanol. Yield: 2.5 g. of colourless crystals. Melting point: 153° C.

*Analysis.*—$C_{11}H_{20}N_2O_5SCl_2$: Calculated: C, 34.80; H, 4.09; N, 8.12; Cl, 20.54. Found: C, 34.5; H, 4.2; N, 7.8; Cl, 19.6.

11.5 g. of this product are introduced into a solution of 1.6 g. of sodium in 50 ml. of 1,2-mercaptoethanol and stirred overnight. The mixture is diluted with 100 ml. of dry acetone, filtered, the residue washed with acetone and stirred with 40 ml. of water, filtered, and again washed with water and methanol. The dried residue is dissolved in 50 ml. of dimethylformamide at 40° C., diluted with 20 ml. of methanol and cooled in an ice-salt mixture. The product is filtered, washed with methanol and dried at 40° C. in vacuo. 9 g. of colourless crystals of melting point 114° C. are obtained.

*Analysis.*—$C_{14}H_{24}N_2O_9S_2$: Calculated: C, 39.06; H, 6.09; N, 6.51; S, 14.90. Found: C, 39.21; H, 5.53; N, 6.42; S, 14.60.

EXAMPLE 12

Bis-(2-hydroxyethyl-β-thiopropionyl-carbamoyl)-ethylenediamine

(18)
HO—CH₂CH₂—S—CH₂CH₂—CONH—CO—NH—
CH₂CH₂—NH—CO—NH—CO—CH₂CH₂—S—
HO—CH₂CH₂

6 g. of ethylenediamine are dissolved in 100 ml. of absolute ether and 27.6 g. of β-chloropropionylisocyanate dissolved in 200 ml. of absolute ether are added dropwise thereto at —10° C. When addition is complete, the mixture is stirred for a further 3 hours at room temperature, the product filtered and washed with ether. Yield: 22.5 g. of colourless crystals. Melting point, after recrystallisation from glacial acetic acid: 212° C.

*Analysis.*—$C_{10}H_{18}O_4N_4Cl_2$: Calculated: C, 36.79; H, 4.88; N, 17.13; Cl, 21.71. Found: C, 36.67; H, 5.01; N, 16.98; Cl, 21.7.

0.92 g. of sodium are dissolved in 30 ml. of 1,2-mercaptoethanol and 7.74 g. of the reaction product obtained are added thereto whilst cooling in ice. The mixture is stirred for a further 48 hours at room temperature, the product filtered, washed with water and dried in vacuo at 40° C. 6.3 g. of colourless crystals of melting point 186° C. are obtained.

*Analysis.*—$C_{14}H_{28}N_4O_6S_2$: Calculated: C, 40.96; H, 6.38; N, 13.65; S, 15.62. Found: C, 40.83; H, 6.11; N, 13.59; S, 15.60.

EXAMPLE 13

Bis-(2-hydroxyethyl-β-thiopropionyl-carbamoyl)-adipic acid diamide

(19)
HOCH₂CH₂—S—CH₂CH₂—CO—NH—CO
—NH—CO—(CH₂)₄—CO—NH—CO
—NH—CO—CH₂CH₂—HOCH₂CH₂—S 29 g. of β-chloropropionylisocyanate are poured over 14.4 g. of adipic acid diamide and the mixture slowly heated to 110° C. A vigorous reaction starts at this temperature and is retarded by external cooling with ice. The mixture is allowed to cool to room temperature, boiled with 200 ml. of methanol, filtered hot, and the residue is dissolved in 80 ml. of dimethylformamide; the solution is filtered, mixed with 150 ml. of methanol, cooled, filtered, and the residue washed with methanol and crystallised from 100% acetic acid. 2.6 g. of colourless crystals of melting point 170° C. (with decomposition) are obtained.

*Analysis.*—$C_{14}H_{20}N_4O_6Cl_2$: Calculated: C, 40.88; H, 4.90; N, 13.62; Cl, 17.24. Found: C, 40.70; H, 5.00; N, 13.70; Cl, 16.80.

8 g. of the reaction product obtained are stirred into 30 ml. of 1,2-mercaptoethanol and 5 ml. of triethylamine are then added. The mixture is heated to 100° C., allowed to cool slowly, introduced into 300 ml. of water, filtered, and the product washed with water and methanol. 4.7 g. of colourless crystals of melting point 145° C. (with decomposition) are obtained.

*Analysis.*—$C_{18}H_{30}N_4O_8S_2$: Calculated: C, 43.71; H, 6.11; N, 11.30; S, 12.97. Found: C, 43.7; H, 6.1; N, 11.2; S, 12.7.

EXAMPLE 14

Bis-(2-hydroxyethyl-β-thiopropionyl-carbamoyl)-succinic acid diamide (20)

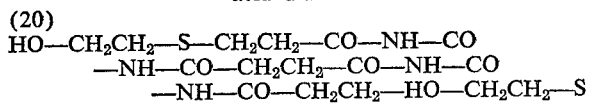

29 g. of β-chloropropionylisocyanate are poured over 11.6 g. of succinic acid diamide and the mixture slowly heated to 110° C. The reaction starts at this temperature and the temperature is held at 120° C. by external cooling. When the reaction has ended, the mixture is allowed to cool to room temperature, stirred with 100 ml. of methanol, the product is filtered and washed with methanol. After recrystallisation from 100% acetic acid mixed with charcoal, 3.1 g. of colourless crystals of melting point 175° C. (with decomposition) are obtained.

*Analysis.*—$C_{12}H_{16}N_4O_6Cl_2$: Calculated: C, 37.61; H, 4.21; N, 14.22; Cl, 18.51. Found: C, 37.57; H, 4.10; N, 14.60; Cl, 18.00.

40 ml. of 1,2-mercaptoethanol are poured over 5.4 g. of the reaction product thus obtained and 3 g. of triethylamine are added dropwise with stirring and whilst cooling in ice. The mixture is stirred for a further 12 hours, diluted with 50 ml. of ether, the product is filtered, washed with 50 ml. of water and again with 30 ml. of methanol. It is dissolved in a little dimethylformamide at 40° C., mixed with three times its volume of methanol, the mixture is cooled and filtered, the residue washed with methanol and dried at 40° C. in vacuo. 5.6 g. of colourless crystals of melting point 167° C. (with decomposition) are obtained.

*Analysis.*—$C_{16}H_{26}N_4O_8S_2$: Calculated: C, 41.19; H, 5.62; N, 12.01; S, 13.75. Found: C, 40.85; H, 5.46; N, 12.01; S, 13.60.

EXAMPLE 15

Bis-(2-hydroxyethyl-β-thiopropionylcarbamoyl) m-phenylenediamine (21)

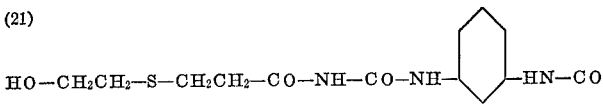

10.8 g. of m-phenylenediamine are dissolved in 100 ml. of acetonitrile and 27 g. of β-chloropropiopionylisocyanate dissolved in 100 ml. of absolute ether are added dropwise thereto at −10° C. The mixture is then stirred for a further 2 hours at room temperature, the product filtered and washed with ether. 32 g. of colourless crystals of melting point 242° C. are obtained.

*Analysis.*—$C_{14}H_{16}N_4O_4Cl_2$: Calculated: C, 44.82; H, 4.30; N, 14.93; Cl, 17.41. Found: C, 45.1; H, 4.60; N, 15.1, Cl, 17.4.

3.8 g. of the reaction product obtained, dissolved in 20 ml. of dimethylformamide, are added to a solution of 0.46 g. of sodium in 16 ml. of 1,2-mercaptoethanol, the mixture is stirred for 24 hours at room temperature and diluted with 100 ml. of ether, the product is filtered, washed with water and methanol and dried at 40° C. in vacuo. The product is dissolved in a little dimethylformamide at 40° C., mixed with methanol until the solution begins to turn cloudy, cooled in ice, filtered, the residue washed with methanol and dried at 40° C. in vacuo. Yield: 3.7 g. of colourless crystals. Melting point: 181° C., with decomposition.

*Analysis.*—$C_{18}H_{26}N_4O_6S_2$: Calculated: C, 47.15; H, 5.68; N, 12.25; S, 13.99. Found: C, 46.8; H, 5.7; N, 12.3; S, 14.0.

EXAMPLE 16

Thiodiglycol-bis-(2-hydroxyethyl-β-chloropropionylcarbamic acid ester (5)

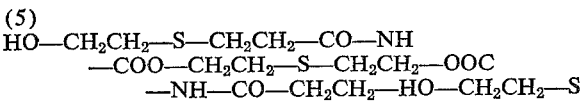

49.7 g. of thiodiglycol are suspended in 400 ml. of absolute ether and 105 g. of β-chloropropionylisocyanate dissolved in 100 ml. of absolute ether are added dropwise with stirring and cooling in ice. The temperature should be between 0 and 5° C. When addition is complete, the mixture is stirred for a further 12 hours at room temperature, filtered, the residue washed with ether and recrystallised from 100% acetic acid. 125 g. of colourless crystals of melting point 169° C. are obtained.

*Analysis.*—$C_{12}H_{14}N_2O_6SCl_2$: Calculated: C, 38.01; H, 2.13; N, 7.39; S, 8.46; Cl, 18.70. Found: C, 37.67; H, 2.51; N, 7.13; S, 8.23; Cl, 18.60.

7.8 g. of the reaction product obtained are suspended in 30 ml. of 1,2-mercaptoethanol and 5 g. of triethylamine are added dropwise whilst cooling in ice. The mixture is stirred for a further 24 hours at room temperature, diluted with 100 ml. of methanol, the product is filtered and washed with methanol. After recrystallisation from 100% acetic acid 5.6 g. of colourless crystals of melting point 160° C. are obtained.

*Analysis.*—$C_{16}H_{28}N_2O_8S_3$: Calculated: C, 40.68; H, 5.93; N, 5.93; S, 20.32. Found: C, 40.62; H, 5.61; N, 5.82; S, 20.10.

EXAMPLE 17

Bis-(2-hydroxyethyl-β-thiopropionyl-carbamoyl) ethanediol (22)

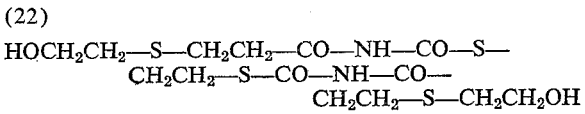

9.4 g. of 1,2-ethanedithiol are dissolved in 100 ml. of absolute ether and 26.8 g. of β-chloropropionylisocyanate dissolved in 100 ml. of absolute ether are added dropwise thereto whilst cooling in ice. The mixture is then stirred for a further 12 hours at room temperature, the product filtered and washed with ether. Yield: 19 g. of colourless crystals of melting point 206° C. (with decomposition).

*Analysis.*—$C_{10}H_{14}N_2O_4S_2Cl_2$: Calculated: C, 33.29; H, 3.91; N, 7.75; S, 17.75; Cl, 19.63. Found: C, 33.09; H, 3.80; N, 7.74; S, 17.60; Cl, 19.60.

60 ml. of 1,2-mercaptoethanol are stirred with 21.66 g. of the reaction product thus obtained and 12.6 g. of triethylamine are added dropwise thereto whilst cooling in ice. The mixture is then stirred for a further 24 hours at room temperature, diluted with 1000 ml. of ether, filtered, the residue dissolved in 300 ml. of hot methanol, cooled, filtered and washed with ether. After recrystallisation from 100% acetic acid 23 g. of colourless crystals of melting point 154° C. are obtained.

*Analysis.*—$C_{14}H_{24}N_2O_6S_4$: Calculated: C, 37.50; H, 5.62; N, 6.27; S, 28.80. Found: C, 37.75; H, 5.65; N, 6.38; S, 28.50.

EXAMPLE 18

Bis-(2-hydroxyethyl-β-thiopropionyl-carbamoyl) malonyl-dihydrazide

(23) $HOCH_2CH_2$—S—$CH_2CH_2$—CO—NH—CO—NH—NH—CO—$CH_2$—CO—NH—NH—CO—NH—$COCH_2CH_2$—$HOCH_2CH_2$—S 6.6 g. of malonic acid dihydrazide are suspended in 200 ml. of acetonitrile and 14.8 g. of β-chloropropionylisocyanate are added all at once. The mixture is boiled for 12 hours, cooled, and the product filtered and washed with ether. After twice recrystallising from 100% acetic acid, 20 g. of colourless crystals of melting point 190° C. (with decomposition) are obtained.

*Analysis.*—$C_{11}H_{16}N_6O_6Cl_2$: Calculated: C, 33.09; H, 4.01; N, 21.05; Cl, 17.79. Found: C, 33.19; H, 4.01; N, 20.89; Cl, 17.60.

0.23 g. of sodium are dissolved in 15 ml. of 1,2-mercaptoethanol and 1.75 g. of the reaction product obtained as above are added at room temperature. The mixture is stirred for a further 24 hours at room temperature and diluted with 100 ml. of ether. The ether is decanted from the sticky product which has separated out, the residue is triturated with acetone, filtered and washed with methanol and a little water. 1.2 g. of colourless crystals of melting point 166° C. are obtained.

*Analysis.*—$C_{15}H_{26}N_6O_6S_2$: Calculated: C, 37.34; H, 5.43; N, 17.42; S, 13.29. Found: C, 37.40; H, 5.62; N, 17.48; S, 13.10.

EXAMPLE 19

Bis-(2-hydroxyethyl-β-thiopropionyl-carbamoyl) thiophene-2,5-dicarboxylic acid diamide

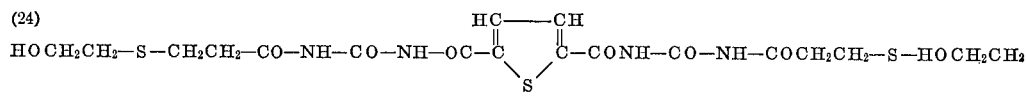

42 g. of thiophene-2,5-dicarboxylic acid dichloride are dissolved in 50 ml. of absolute ether and ammonia is passed in whilst cooling in ice. The diamide which separates out is filtered, washed with ether and is then boiled with 500 ml. of water, filtered, dried in vacuo at 50° C. and recrystallised from dimethylformamide. 32 g. of colourless crystals of melting point 331° C. (with decomposition) are obtained.

60 g. of thiophene-2,5-dicarboxylic acid diamide are suspended in 1000 ml. of ethylene chloride and 200 ml. of oxalyl chloride are added. The mixture is heated with steam until hydrochloric acid evolution has ceased (6 hours). A slightly coloured solution is produced. The excess oxalyl chloride and the ethylene chloride are removed in vacuo and reused for the next batch. The residue is distilled at 1 mm. Hg pressure, whereupon a colourless oil passes over at 125–128° C. and rapidly crystallises in the receiver. Yield: 90%.

11.1 g. of the thiophene-2,5-dicarboyl-isocyanate are dissolved in 60 ml. of chlorobenzene and 10.8 g. of β-chloropropionic acid amide are added. The mixture is boiled for 10 minutes, cooled, filtered, and the residue crystallised from 250 ml. of dimethylformamide. 173 g. of colourless crystals of melting point 141° C. (with decomposition) and of formula

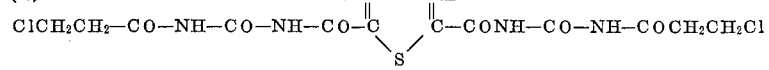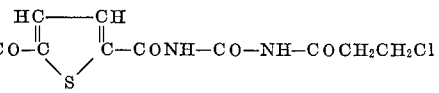

are obtained.

*Analysis.*—$C_{14}H_{14}N_4O_6SCl_2$: Calculated: C, 38.46; H, 3.23; N, 12.81; Cl, 16.22. Found: C, 38.7; H, 3.2; N, 12.8; Cl, 16.3.

0.46 g. of sodium are dissolved in 20 ml. of 1,2-mercaptoethanol and 4.3 g. of the reaction product obtained are introduced into this solution at room temperature. The mixture is stirred for 24 hours at room temperature, diluted with ether, filtered, and the residue washed with ether, triturated with 50 ml. of water, filtered and washed with water. Yield: 2.3 g.

*Analysis.*—$C_{18}H_{24}N_4O_8S_3$: Calculated: C, 41.55; H, 4.68; N, 10.75; S, 18.45. Found: C, 41.35; H, 5.00; N, 10.80; S, 18.20.

EXAMPLE 20

A silver bromide-iodide emulsion which contains 34 g. of silver per kg. and 0.6 mol percent of iodine and which has been sensitised with gold, is mixed with solutions of the sensitisers to be tested, corresponding to the data of Table I. This emulsion is cast on a layer support, dried, exposed under a step wedge having a wedge constant of 0.15, and then developed for 2 minutes at 20° C. in a developer of the following composition:

| | |
|---|---:|
| p-Methylaminophenyl sulphate _____g__ | 1.5 |
| Hydroquinone _____g__ | 6 |
| Potassium metabisulphite _____g__ | 0.5 |
| Sodium suphite sicc _____g__ | 30 |
| Sodium carbonate sicc _____g__ | 41 |
| Potassium bromide _____g__ | 2 |
| Sodium hexametaphosphate _____g__ | 2 |
| Water to make up to _____ml__ | 1000 |

The developer is diluted 1:1 with water before use. The material is then fixed, watered and dried in the usual manner. The resulting curves are evaluated by means of an Ansco-Macbeth densitometer. Under these conditions, after deducting the haze, an extension of the wedge by 2 steps relative to an emulsion without the thioehers of invention corresponds to a sensitivity increase of 100%.

In Table I the number in Column 1 corresponds to the number of the example describing the manufacture of the thioether.

The sensitisers of the invention have the advantage that they influence the gradation at constant sensitivity increase. For example the sensitisers according to Examples 4, 9, 11, 12, 13 and 14 increase the sensitivity by 100%. The gradation may however be made flatter or steeper depending on the sensitisers used.

EXAMPLE 21

When the sensitizers of the invention are added to the developer a sensitivity increase again takes place as shown in Table II. The sensitisers are added in solution to a developer corresponding to the composition given in Example 20.

Emulsion layers made from a silver bromide-iodide emulsion corresponding to Example 20 are exposed under a wedge and developed for 2 minutes at 20° C. with a developer containing one of the sensitisers of the invention. The curves are evaluated as stated in Example 20.

EXAMPLE 22

A silver bromide-iodide emulsion of composition corresponding to Example 20 is mixed with 0.0012 mol of the sensitiser of Example 8 and is cast, dried, exposed, developed and evaluated in accordance with Example 20. The sensitivity gain is 200% relative to an emulsion without the addition of thioether at a maximum density of 2.00 and a haze of 0.10. When however the same layer is developed at 20° C. for 2 minutes in the developer according to Example 20 with the addition of 0.0155 mol of the sensitiser of Example 5 per litre of developer the sensitivity is as much as 250% with a haze of 20 and a maximum density of 2.84. It is not necessary to use the same sensitiser in the layer and in the developer.

wherein $r$ is at the most 2; and when X=—NH—, Y may also denote —SO$_2$— and when X=—NH—,

—NH—CO— or —NH—NH—CO—, Y may also be a member selected from the group consisting of a phenylene group and a 2,5-thiophene group; and $m$ and $n$ each is at the most 2.

2. A thioether of the formula

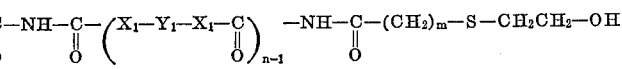

wherein X$_1$ denotes a member selected from the group consisting of an oxygen atom a group —NH— and

TABLE I

| Thioether according to Example | Thioether dissolved in 100 ml. | Amount added per mol of silver halide, mol | Sensitivity increase in percent, relative to 0 | Haze | Maximum density |
|---|---|---|---|---|---|
| 0 | | | | 0.10 | 1.14 |
| 1 | Dimethylformamide/alcohol 1:2 | 0.0026 | 50 | 0.10 | 1.82 |
| 2 | Water/alcohol 1:3 | 0.0026 | 50 | 0.10 | 1.66 |
| 3 | do | 0.0026 | 50 | 0.10 | 1.52 |
| 4 | Water/alcohol 2:3 | 0.0026 | 100 | 0.10 | 1.82 |
| 5 | do | 0.0026 | 200 | 0.14 | 2.06 |
| 6 | Water | 0.0026 | 200 | 0.14 | 2.10 |
| 7 | Water ph 7 | 0.0026 | 25 | 0.12 | 1.56 |
| 8 | Water | 0.0026 | 250 | 0.10 | 2.00 |
| 9 | do | 0.0026 | 100 | 0.10 | 1.76 |
| 10 | Alcohol | 0.0026 | 25 | 0.10 | 1.66 |
| 11 | do | 0.0026 | 100 | 0.10 | 1.60 |
| 12 | do | 0.0026 | 100 | 0.10 | 1.02 |
| 13 | do | 0.0026 | 100 | 0.10 | 1.88 |
| 14 | Dimethylformamide/alcohol 1:1 | 0.0026 | 100 | 0.10 | 1.09 |
| 16 | Dimethyl formamide/alcohol 1:3 | 0.0026 | 150 | 0.10 | 2.34 |

TABLE II

| Thioether according to Example | Thioether dissolved in 100 ml. | Amount added per litre of developer, mol | Sensitivity increase in percent, relative to 0 | Haze | Maximum density |
|---|---|---|---|---|---|
| 0 | | | | 0.10 | 1.63 |
| 1 | Dimethylformamide/alcohol 1:2 | 0.0032 | 100 | 0.10 | 1.72 |
| 1 | do | 0.0016 | 150 | 0.10 | 2.34 |
| 1 | do | 0.0032 | 200 | 0.14 | 2.64 |
| 5 | Water/alcohol 3:2 | 0.00032 | 50 | 0.10 | 1.78 |
| 5 | do | 0.0016 | 50 | 0.10 | 2.34 |
| 5 | do | 0.0032 | 100 | 0.12 | 2.38 |
| 6 | Water | 0.00032 | 100 | 0.10 | 1.90 |
| 6 | do | 0.0016 | 100 | 0.10 | 2.33 |
| 6 | do | 0.0032 | 200 | 0.12 | 2.80 |
| 8 | do | 0.00032 | 100 | 0.10 | 1.72 |
| 8 | do | 0.0016 | 150 | 0.10 | 2.66 |
| 8 | do | 0.0032 | 200 | 0.12 | 2.64 |
| 13 | do | 0.00032 | 100 | 0.10 | 1.76 |
| 13 | do | 0.0016 | 100 | 0.10 | 2.36 |
| 13 | do | 0.0032 | 200 | 0.14 | 2.68 |

I claim:
1. A thioether of the formula

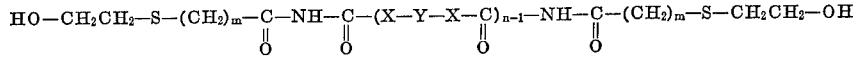

wherein X denotes a member selected from the group consisting of an oxygen atom, a sulfur atom, a group —NH—, —NH—CO— and —NH—NH—CO—, in which the groups containing —NH—CO— are bound to Y by the carbon atoms; Y denotes a member selected from the group consisting of a group —(CH$_2$—)$_p$ wherein $p$=1 to 10, a group —(CH$_2$—)$_r$—[O—(CH$_2$—)$_r$]$_q$— wherein $q$=1 to 4 and $r$ is at the most 2, and a group —(CH$_2$—)$_r$—S—(CH$_2$—)$_r$—

—NH—CO—, in which the —NH—CO— group is bound to Y$_1$ by the carbon atom, Y$_1$ denotes a member selected from the group consisting of a group —(CH$_2$)$_{p_1}$— wherein $p_1$=2 to 10, a group

—CH$_2$CH$_2$—(O—CH$_2$CH$_2$)$_q$— wherein $q$=1 to 4 and a group

—CH$_2$CH$_2$—S—CH$_2$CH$_2$— and $m$ and $n$ each is 1 or 2.

3. A thioether of the formula

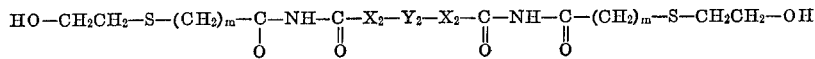

wherein $X_2$ denotes an oxygen atom, $Y_2$ denotes a member selected from the group consisting of a group $-CH_2CH_2-(O-CH_2CH_2)_q-$ in which $q=1$ to 4, and a group $-CH_2CH_2-S-CH_2CH_2-$, and $m$ is 1 to 2.

4. The thioether of formula

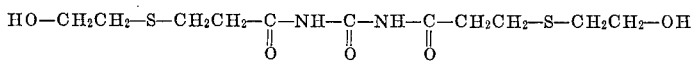

5. The thioether of formula

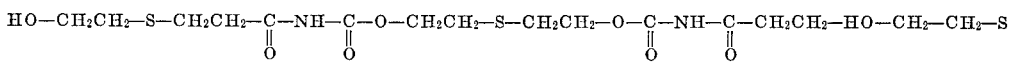

6. A thioether of formula

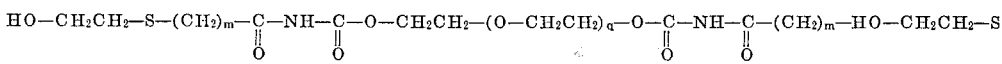

wherein $q=1$ to 4 and $m=1$ or 2.

7. A thioether of formula

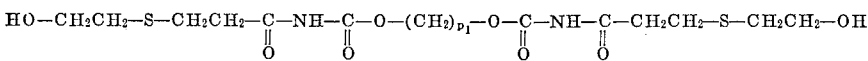

wherein $p_1$ denotes 2 to 10.

References Cited
UNITED STATES PATENTS

| | | | |
|---|---|---|---|
| 2,944,898 | 7/1960 | Beavers | 96—66 |
| 3,253,919 | 5/1966 | Beavers | 96—50 |

JAMES A. PATTEN, Primary Examiner

E. J. GLEIMAN, Assistant Examiner

U.S. Cl. X.R.

96—107; 260—332.2, 455, 553, 554